United States Patent Office 3,480,541
Patented Nov. 25, 1969

3,480,541
SEWAGE FLOCCULATION
Ronald D. Lees, Houston, Tex., assignor to Hercules Incorporated, Wilmington, Del., a corporation of Delaware
No Drawing. Filed Dec. 31, 1968, Ser. No. 789,015
Int. Cl. C02c 1/40, 5/10, 1/02
U.S. Cl. 210—18                                    8 Claims

ABSTRACT OF THE DISCLOSURE

A process of providing for the flocculation and sedimentation of solids of raw influence sewage slurry with cationic polymers, at least a portion of said sewage slurry having been subjected to aerobic microbial action.

---

The present invention relates to sewage treatment, and more particularly to an improved process of removing suspended solids from an aqueous raw influent sewage slurry, at least a portion of which sewage has been subjected to aerobic microbial action (oxidation), which comprises aiding the separation of the solids from the water by contacting the sewage slurry with a flocculating agent.

In a typical sewage treatment plant the steps involved often include, in the order given, (1) primary sedimentation (usually after coarsely screening the raw sewage slurry through grit separators), (2) aeration, (3) digestion, (4) elutriation, (5) vacuum filtration, and (6) incineration.

The disclosure that at least a portion of the sewage has been subjected to aerobic microbial action is satisfied e.g. by one or more of the following.

(1) Some or all of the raw influent sewage slurry having been aerated, (2) Recirculation to the raw influent sewage slurry (a portion of which, all or none may have been aerated) of one or more streams resulting from treatment of sewage effluent (supernatant overflow) from the primary sedimentation step (secondary solids streams) or from subsequent steps (tertiary, etc. solids streams).

The amount of suspended solids present in raw influent sewage slurry varies widely, e.g. usually about 100–700 p.p.m. dry weight basis by weight of the total sewage slurry. When raw sewage enters a treatment plant, it is coarsely screened through grit separators and pumped to primary sedimentation tanks. The sewage is held in the primary sedimentation tanks until some of the suspended solids settle out by gravity. During this process, suspended particles agglomerate, shrink, lose some of their water, and ultimately settle. However this gravity settling process is intolerably slow, requiring several hours as compared with only a few minutes for the grit separation. Furthermore far too much of the suspended solids fails to agglomerate and therefore remains suspended. Since the primary sedimentation process is continuous so that raw sewage is continuously pumped into the primary sedimentation tanks, the buildup of unsettled solids rapidly overloads these tanks. This buildup of the suspended solids in influent sewage is extremely undesirable because it makes it necessary to employ extra steps to reduce the biological oxygen demand of this sewage before it can be discharged into natural streams.

Heretofore several sewage treatment plants have added anionic polyelectrolytes as flocculating and settling aids to the primary sedimentation facilities and thereby reduced the necessary tank "hold" time. This permitted an increase in the influent flow to the primary sedimentation basins without the usual detrimental solids buildup in the influent. This increased the rate of flocculation and the amount of solids recovered. However serious difficulties were encountered in cases where some or all of the raw influent sewage slurry had been subjected to microbial aerobic action, this difficulty being directly proportional to the percentage of sewage which had been so subjected and to that varying degree destroying or preventing the beneficial effects of the anionic polyelectrolytes. In fact in certain systems the prior art has been unable to use anionic polyelectrolytes at all because they did a worse job than using no flocculant (e.g. see Table 3 hereinafter).

According to the present invention it has been found that the foregoing difficulties are overcome or greatly minimized and the foregoing improvements are substantially completely realized by employing a particular cationic polyelectrolyte, namely an acrylamide-beta methacryloyloxyethyltrimethylammonium methyl sulfate copolymer. This particular cationic copolymer even when used in very small amounts relative to the sewage being treated, effects these desirable results at least in part by increasing the flocculation rate, floc size and floc density and these in turn give a substantially faster sedimentation rate and also an appreciable increase in the percent solids recovered.

The effectiveness of the particular copolymer of the present invention as a flocculant in the treatment of raw influent sewage at least a portion of which has been subjected to microbial action has been demonstrated both in the laboratory and in actual practice as experienced in sewage treatment plants.

The following examples illustrate various embodiments of the present invention. These examples are not intended to limit the present invention beyond the scope of the appended claims. In these examples and elsewhere herein parts and percent are by weight unless otherwise indicated.

EXAMPLES 1–16

Laboratory runs

These runs were carried out to determine the effect of various polymeric flocculating agents on the recovery of suspended solids from an aerated raw influent aqueous sewage slurry.

Aerated raw influent aqueous sewage slurry containing 350 p.p.m. suspended solids was taken from a sewage treatment plant just after it was aerated and just before it was passed into the primary sedimentaation tanks. One liter of this aerated raw influent sewage was placed in each of several clean 1-liter graduated cylinders. Flocculating agent was then added to the sewage slurry and mixed therewith by inverting the graduated cylinders 10 times, after which the cylinders were allowed to stand for 1 hour. A 50-ml. portion of the supernatant was pipetted from each of the graduated cylinders at the 900-ml. mark and filtered through a weighed glass fiber filter paper having a pore size of 1 micron. The filter paper was oven dried 1 hour at 110° C. and reweighed to determine the percent solids settled.

Further details appear in Table 1 hereinafter.

TABLE 1.—LABORATORY RUNS

Effect of Various Polymeric Flocculating Agents on Suspended Solids Recovery from Aerated Raw Influent Sewage

| Ex. No. | Flocculating Agent | | | Percent Solids Settled [b] |
|---|---|---|---|---|
| | Name | Type | Amount [a] | |
| 1 | None | None | None | 20 |
| 2 | Sulfonated Polystyrene [c] | Anionic | 1.6 | 55 |
| 3 | 90% Acrylamide-10% Sodium Acrylate | do | 0.6 | 62 |
| 4 | 50% Acrylamide-50% Sodium Acrylate | do | 1.0 | 44 |
| 5 | 96% Acrylamide-4% MTMMS | Cationic | 0.5 | 32 |
| 6 | do | do | 0.10 | 44 |
| 7 | do | do | 0.50 | 91 |
| 8 | do | do | 5.00 | 93 |
| 9 | 83% Acrylamide-17% MTMMS | do | 0.05 | 28 |
| 10 | do | do | 0.10 | 41 |
| 11 | do | do | 0.50 | 87 |
| 12 | do | do | 5.00 | 92 |
| 13 | 60% Acrylamide-40% MTMMS | do | 0.05 | 25 |
| 14 | do | do | 0.10 | 33 |
| 15 | do | do | 0.50 | 79 |
| 16 | do | do | 5.00 | 93 |

[a] P.p.m. dry weight basis by weight of total sewage treated, added as a 0.01% aqueous solution.
[b] Based on suspended soilds conc. of 350 p.p.m. and 1 hr. settling time.
[c] Flocculating agent available commercially as "Purifloc A-21."

EXAMPLES 17–24

Sewage plant runs

These runs were carried out to determine the effect of various polymeric flocculating agents on the recovery of suspended solids from an aerated raw influent aqueous sewage slurry.

Flocculating agent was fed into the sewage treatment plant at a point just prior to the flow of the aerated raw influent aqueous sewage slurry (containing about 215 p.p.m. suspended solids) into the primary sedimentation tanks. Samples were taken from the effluent (supernatant overflow) from the primary sedimentation tanks and the percent solids settled determined from these. The sampling time, i.e. the time between addition of the flocculating agent and making this determination on the thus treated samples, was approximately 1 hour.

Further details appear in Table 2 hereinafter.

the primary sedimentation tank effluent (overflow) of a sewage plant. This sewage slurry comprised a mixture of the following:

(1) Raw influent sewage passed into the primary sedimentation tank without previous aeration, (2) Recycle of effluent (overflow) from a conventional thickener tank which further concentrated (a) the solids in the sludge from the primary sedimentation tank, and
(b) the sludge resulting from aeration followed by final sedimentation of the effluent (overflow) from the primary sedimentation tank, and (3) Recycle effluent (overflow) from the elutriation step, the influent to which is sludge taken from the thickener tank and the digestion step.

One liter of this aqueous sewage slurry mixture was placed in each of several clean 1-liter graduated cylinders. Flocculating agent was then added to the sewage slurry and mixed therewith by inverting the graduated cylinders

TABLE 2.—SEWAGE PLANT RUNS

Effect of Various Polymeric Flocculating Agents on Suspended Solids Recovery from Aerated Raw Influent Sewage

| Ex. No. | Flocculating Agent | | | Percent Solids Settled [b] |
|---|---|---|---|---|
| | Name | Type | Amount [a] | |
| 17 | None | None | None | 32 |
| 18 | Sulfonated Polystyrene [c] | Anionic | 0.92 | 40 |
| 19 | do [c] | do | 1.40 | 46 |
| 20 | do [c] | do | 1.62 | 57 |
| 21 | do [c] | do | 1.63 | 55 |
| 22 | 90% Acrylamide-10% Sodium Acrylate | do | 0.31 | 32 |
| 23 | do | do | 0.78 | 44 |
| 24 | 83% Acrylamide-17% MTMMS | Cationic | 0.54 | 63 |

[a] P.p.m. dry weight basis by weight of total sewage treated added as a 0.05% aqueous solution.
[b] Based on suspended solids conc. of about 215 p.p.m. and 1 hr. settling time.
[c] Flocculating agent availabe commercially as "Purifloc A-21."

EXAMPLES 25–34

Laboratory runs

These runs were carried out to determine the effect of various polymeric flocculating agents on the recovery of suspended solids from a mixture of raw influent sewage and recycle streams, a portion of which sewage had been aerated.

Samples of an aqueous sewage slurry were taken from 10 times, after which the cylinders were allowed to stand for 1 hour. A 50-ml. portion of the supernatant was pipetted from each of the graduated cylinders at the 900-ml. mark and filtered through a weighted glass fiber filter paper having a pore size of 1 micron. The filter paper was oven dried 1 hour at 110° C. and reweighed to determine the percent solids settled.

Further details appear in Table 3 hereinafter.

TABLE 3.—LABORATORY RUNS

Effect of Various Polymeric Flocculating Agents on Suspended Solids Recovery from a Mixture of Raw Influent Sewage and Sewage from Recycle Streams, a Portion of which Sewage had been Aerated

| Ex. No. | Flocculating Agent | | | Percent Solids Settled [b] |
|---|---|---|---|---|
| | Name | Type | Amount [a] | |
| 25 | None | None | None | 41 |
| 26 | Sulfonated Polystyrene [c] | Anionic | 0.50 | 20 |
| 27 | 50% Acrylamide-50% Sodium Acrylate | do | 0.50 | 18 |
| 28 | do | do | 1.50 | 15 |
| 29 | 90% Acrylamide-10% Sodium Acrylate | do | 0.10 | 21 |
| 30 | do | do | 1.50 | 19 |
| 31 | 96% Acrylamide-4% MTMMS | Cationic | 0.10 | 55 |
| 32 | 83% Acrylamide-17% MTMMS | do | 0.10 | 73 |
| 33 | do | do | 1.25 | 76 |
| 34 | 60% Acrylamide-40% MTMMS | do | 0.10 | 75 |

[a] P.p.m. dry weight basis by weight of the total sewage treated added as a 0.01% aqueous solution.
[b] Based on suspended solids conc. of 342 p.p.m. and 1 hr. settling time.
[c] Flocculating agent available commercially as "Purifloc A-21."

As pointed out hereinbefore there are certain systems wherein the prior art has not only had difficulties with trying to use anionic polyelectrolytes as flocculants and settling aids but wherein a poorer job was done with than without these flocculants, Table 3 above being representative of such systems.

EXAMPLES 35 and 36

Sewage plant runs

These runs were carried out to determine the effect of various polymeric flocculating agents on the recovery of suspended solids from the same sewage mixture an in Examples 25–34 except they were carried out directly in a sewage treatment plant.

Flocculating agent was fed into the sewage treatment plant at a point just prior to the flow of raw influent aqueous sewage slurry into the primary sedimentation tanks into which passed the same recycle streams as set forth in Examples 25–34. Samples were taken from the effluent (overflow) from the primary sedimentation tanks and the percent solids settled determined from these. The sampling time, i.e. the time between addition of the flocculating agent and making this determination on the thus treated samples, was approximately hour.

Further details appear in Table 4 hereinafter.

TABLE 4.—SEWAGE PLANT RUNS

Effect of Various Polymeric Flocculating Agents on Suspended Solids Recovery from a Mixture of Raw Influent Sewage and Sewage from Recycle Streams

| Ex. No. | Flocculating Agent | | | Percent Solids Settled [b] |
|---|---|---|---|---|
| | Name | Type | Amount [a] | |
| 35 | None | None | None | 62 |
| 36 | 83% Acrylamide-17% MTMMS | Cationic | 0.09 | 76 |

[a] P.p.m. dry weight basis by weight of the total sewage treated added as a 0.05% aqueous solution.
[b] Based on suspended soilds conc. of about 350 p.p.m. and 1 hr. settling time.

From the foregoing examples it is readily apparent that the particular cationic copolymer flocculating agent of the present invention, as compared with several typical polymeric flocculating agents of the prior art, gives substantially improved flocculation both from the standpoint of increased rate of flocculation and total amount of suspended solids recovery. The amount of flocculating agent of the present invention required is also considerably less than that of the prior art. Very small amounts give substantial improvements in both rate of flocculation and total amount of suspended solids recovery, for instance, as little as 0.10 p.p.m. by weight of the total sewage being treated gave almost twice as much suspended solids recovery as the control (Table 3, Example 36). About 0.05–5 p.p.m., dry weight basis by weight of the total sewage treated, of the particular cationic copolymer flocculating agent of the present invention gives these improvements to a substantial degree. Preferably the amount of copolymer flocculating agent used in accordance with the present invention will be about 0.1–3 p.p.m., dry weight basis by weight of the total sewage treated, 0.1–1 p.p.m. being specifically preferred. Those skilled in the art to which this invention relates will appreciate that sewage systems vary tremendously and that the amount of any given flocculating agent employed will vary accordingly. The foregoing examples were carried out on the same sewage system as shown.

The cationic acrylamide-MTMMS copolymer flocculating agents applicable in the present invention consist by weight thereof essentially of 99%–20% acrylamide and 1%–80% MTMMS, preferably 97%–50% acrylamide and 3%–50% MTMMS, 95%–60% acrylamide and 5%–40% MTMMS being specifically preferred. Preparation of these cationic acrylamide-MTMMS copolymers applicable herein, and the preparation of the anionic acrylamide-sodium acrylate copolymers employed in the examples hereof and not otherwise identified, are set forth in U.S. Patents Nos. 3,336,269 and 3,336,270.

Although the flocculating agent in accordance with the present invention may be added in dry form to the sewage being treated, it is preferred that it be added as an aqueous solution in order to obtain faster and more complete dispersion thereof throughout the sewage slurry.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of treating raw influent sewage slurry, at least a portion of which has been subjected to aerobic microbial action, which comprises contacting said sewage slurry with an acrylamide-beta methacryloyloxyethyltrimethylammonium methyl sulfate copolymer, thereby (1) increasing the rate at which suspended solids flocculate and settle out of said sewage, and (2) increasing the amount of suspended solids which flocculate and settle out.

2. Process of claim 1 wherein said copolymer consists by weight thereof essentially of 99%–20% acrylamide and 1%–80% beta methacryloyloxyethyltrimethylammonium methyl sulfate.

3. Process of claim 1 wherein said copolymer consists by weight thereof essentially of 97%–50% acrylamide and 3%–50% beta methacryloyloxyethyltrimethylammonium methyl sulfate.

4. Process of claim 1 wherein said copolymer consists by weight thereof essentially of 95%–60% acrylamide and 5%–40% beta methacryloyloxyethyltrimethylammonium methyl sulfate.

5. Process of treating raw influent sewage slurry, at least a portion of which has been subjected to aerobic microbial action, which comprises stirring a mixture of said sewage slurry and a small amount of acrylamide-beta methacryloyloxyethyltrimethylammonium methyl sulfate copolymer, allowing the resulting slurry to settle, thereby (1) increasing the rate at which suspended solids flocculate and settle out of said sewage, and (2) increasing the amount of suspended solids which flocculate and settle out.

6. Process of claim 5 wherein the amount of said copolymer is about 0.05–5 p.p.m. dry weight basis by weight of the total sewage treated.

7. Process of claim 5 wherein the amount of said copolymer is about 0.1–3 p.p.m. dry weight basis by weight of the total sewage treated.

8. Process of claim 5 wherein the amount of said copolymer is about 0.1–1 p.p.m. dry weight basis by weight of the total sewage treated.

References Cited

UNITED STATES PATENTS

| | | | |
|---|---|---|---|
| 3,259,569 | 7/1966 | Priesing et al. | 210—46 |
| 3,414,513 | 12/1968 | Buhl et al. | 210—54 |
| 3,414,514 | 12/1968 | Buhl | 210—54 |

MICHAEL E. ROGERS, Primary Examiner

U.S. Cl. X.R.

210—7, 46, 52